March 7, 1967 B. F. McNAMEE 3,308,391
REGULATED VARIABLE FREQUENCY POWER SUPPLY
HAVING MEANS FOR OVERLOAD PROTECTION
Filed Dec. 23, 1963 3 Sheets-Sheet 1
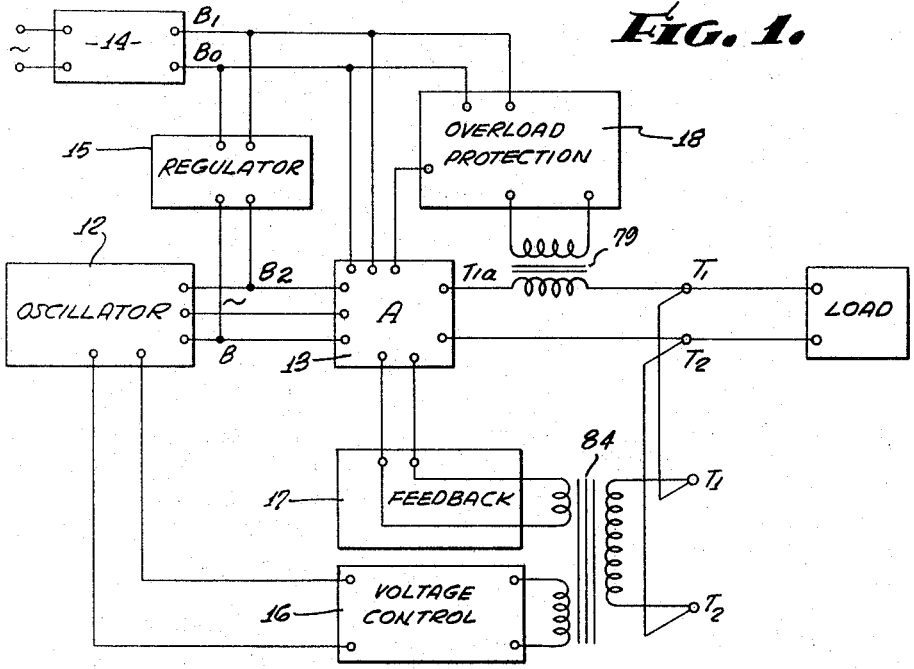
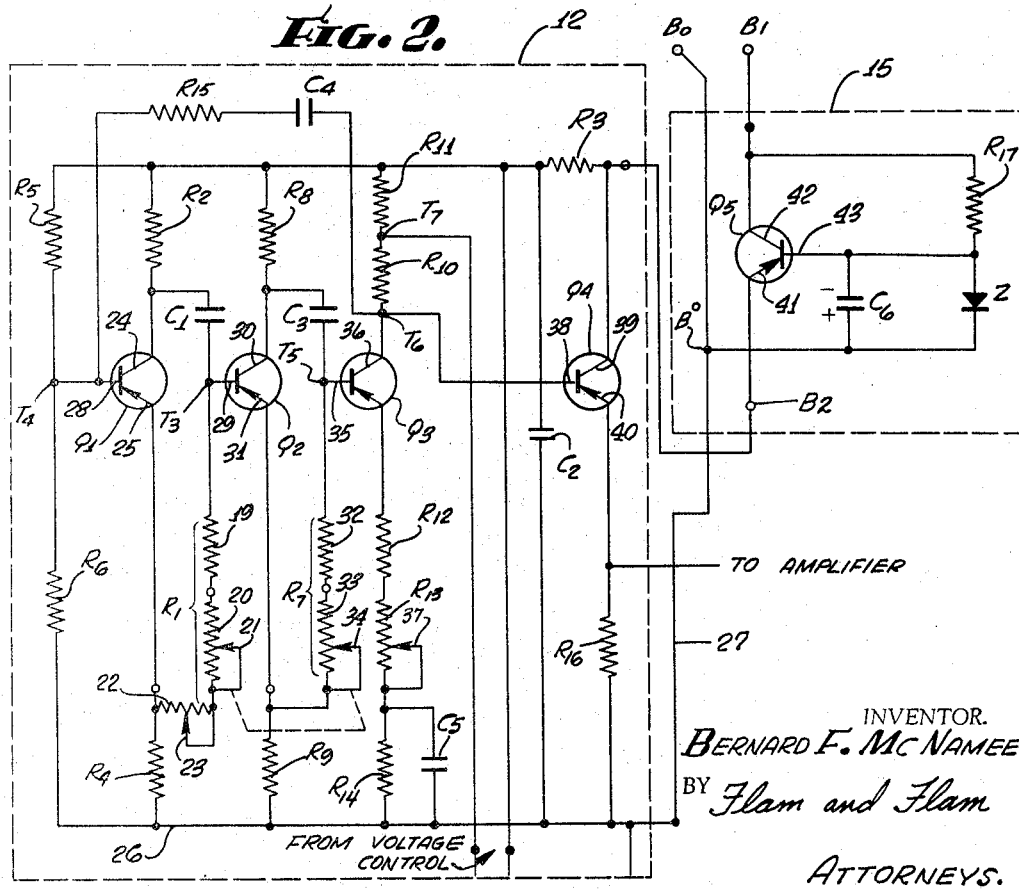
INVENTOR.
BERNARD F. MCNAMEE
BY Flam and Flam
ATTORNEYS.

INVENTOR.
BERNARD F. McNAMEE
BY Flam and Flam
ATTORNEYS.

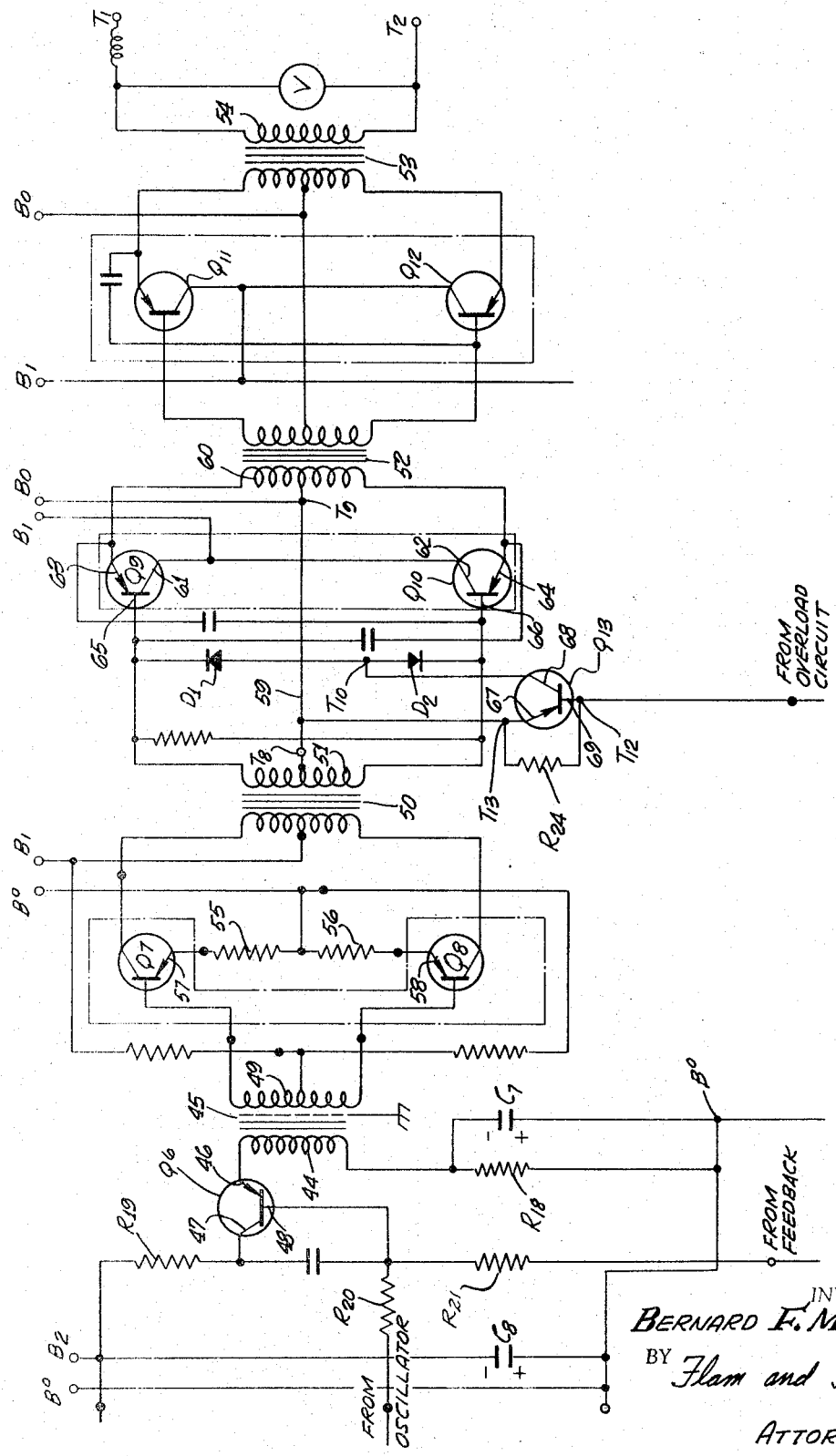

United States Patent Office 3,308,391
Patented Mar. 7, 1967

3,308,391
REGULATED VARIABLE FREQUENCY POWER SUPPLY HAVING MEANS FOR OVERLOAD PROTECTION
Bernard F. McNamee, Altadena, Calif., assignor to Dressen-Barnes Electronics Corp., Pasadena, Calif., a corporation of California
Filed Dec. 23, 1963, Ser. No. 332,655
8 Claims. (Cl. 330—40)

This invention relates to a variable frequency A.C. power supply.

The primary object of this invention is to provide a simple and reliable power supply incorporating only solid state components and having features for regulation, overload protection, and frequency stability.

Another object of this invention is to provide a simple voltage regulating circuit utilizing a tungsten lamp bridge for adjusting the gain of the oscillator circuit to maintain output voltage within a desired small range of values.

When the bridge is cold and the system started, signals generated by the bridge demand increased output whereas the output may already be high. Accordingly, an object of this invention is to provide simple time delay means for preventing the system from increasing output until the lamps have reached thermal equilibrium.

Still another object of this invention is to provide a unique trip circuit utilizing solid state elements for causinng the supply to shut down, and which cannot resume normal output functions until reset.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a block diagram illustrating a variable frequency A.C. power supply;

FIG. 2 is a wiring diagram showing the oscillator and its regulated supply;

FIG. 4 is a wiring diagram illustrating the amplifier circuits;

Figure 3:
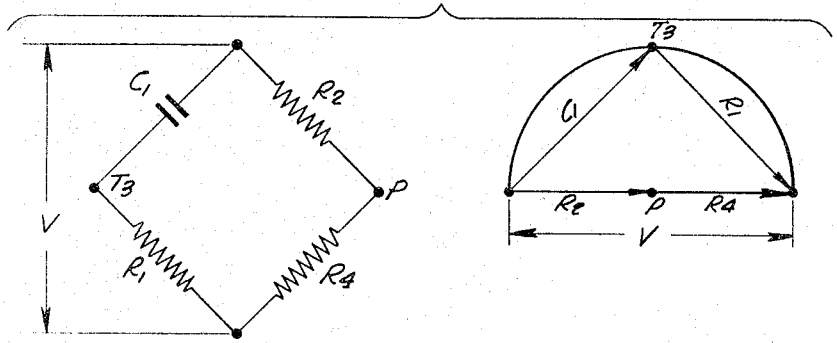
FIG. 3 is an equivalent circuit and phase diagram.

In FIG. 1 the variable frequency A.C. power supply is illustrated by block diagram. A pilot signal for determining the frequency of the supply is developed by an oscillator 12. The oscillator 12 drives a multistage amplifier 13 that provides output terminals T1 and T2.

An unregulated power supply 14 powered by an alternating current source provides direct current excitation for the various components. In order to prevent the load conditions from affecting the voltage applied to the oscillator 12 and hence the stability thereof, a small regulator 15 is interposed between the supply 14 and the oscillator 12. The regulator 15 furthermore provides power for the first stage of the amplifier 13.

A voltage control circuit 16 samples the voltage across the output terminals T1 and T2 and applies a signal to the oscillator 12 in such manner as to maintain the voltage at the terminals T1 and T2 within tolerable limits. Furthermore, the circuit 16 includes adjustable elements for determining the output voltage. A feedback circuit 17 produces a signal proportional to output voltage for application to the first stage of the amplifier 13, thus achieving stability. An overload protection circuit 18 senses the existence of load current beyond a tolerable level and operates to switch off the amplifier 13. The oscillator 12 will first be described in detail with reference to FIG. 2.

The oscillator includes, in series, two similar ninety degree phase shift circuits, a phase inverter circuit, and a feedback loop. A condenser C1 and a serially associated resistor R1 form part of the first phase shift network. An A.C. signal impressed across this circuit experiences a certain phase shift at the intermediate terminal T3. The resistor R1 includes three resistor elements, a fixed resistor 19, a potentiometer resistor 20 cooperable with a shunting slider 21 and a potentiometer resistor 22 cooperable with a shunting slider 23. The potentiometer resistor 20 has an ohmic value twenty or thirty times that of the potentiometer resistor 22 for purposes presently to appear.

A transistor Q1 generates a signal for the phase shift network R1–C1. The outside terminal of the condenser C1 connects to the collector 24, and the outside terminal of the resistor R1 connects with the emitter 25. The transistor Q1 is driven from the supply 15. Thus the collector 24 of the transistor Q1 connects via a load resistor R2 and a current limiting resistor R3 to the B2 terminal of the regulator 15. The emitter 25 connects via load resistor R4 through leads 26 and 27 to the B° terminal of the regulator 15. The resistors R2 and R4 have equal ohmic values for purposes presently to appear.

A biasing potential is applied to the base 28 of the transistor Q1 from a mid terminal T4 of a voltage divider network comprising resistors R5 and R6. The values of the resistors R5 and R6 are chosen as to determine amplifying operation of the transistor Q1 substantially in a linear range throughout the swings of potential normally imposed upon the base 28.

Assuming the existence of a signal of frequency $f_c$ to exist at base 28, then this signal will be amplified by the transistor Q1 and impressed across the phase shift network C1–R1. The signal so generated is furthermore impressed across the resistors R2 and R4 in series. Thus a large condenser C2 connects the outside terminals of resistors R2 and R4 together so that they may be considered at the same alternating current potential.

The equivalent alternating current circuit together with a phase diagram is illustrated in FIG. 3. The transistor signal V is impressed upon a bridge type circuit in which R2 and R4 form one branch and the phase shift network C1 and R1 the other. The terminal T3 is indicated at the junction of C1 and R1. A terminal P, corresponding to the zero alternating current potential as at the lead 26, is illustrated as joining the resistors R2 and R4. The large condenser C2 in fact provides the terminal P.

The signal V of frequency $f_c$ generated by the transistor Q1 is indicated vectorially. The voltage components across C1 and R1 must add vectorially to equal the signal V, and of course must always be in right-angle relationship to each other. Hence, the voltage at the terminal T3 always falls on a circle of which the vector V is the diameter. The drop across resistors R2 and R4 falls along the vector V. If the resistors R2 and R4 are equal, the center of the circle corresponds to the voltage of the point P.

The voltage T3 is shifted 90° relative to the signal V whenever the reactance of the condenser C1 equals the resistance of the resistor R1, and this occurs at one particular frequency $f_c$. Accordingly, a 90° shift relative to common lead 26 is obtained.

The signal T3 is, in turn, impressed upon the second phase shift network. The second phase shift network includes a condenser C3 and a resistor R7 cooperable with a transistor Q2. Thus the terminal T3 from the first phase shift network is directly connected to the base 29 of the transistor Q2. The condenser C3 and resistor R7 together are connected across the collector 30 and emitter 31 of the transistor Q2. The condenser C3 has the same value as the condenser C1, and the resistor R7 corresponds to the resistor R1. The resistor R7 in this instance includes two parts, a fixed resistor 32 and a potentiometer resistor 33 cooperable with the slider 34 which is operative to shunt all or any part of the potentiometer resistor 33. A resistor R8 connects the collector 30 to the B2 supply terminal and a resistor R9 equal in value to the resistor R8 connects the emitter 31 to the lead 26 and the B⁰ terminal. The large condenser C2 operates to connect the outside terminals of resistors R8 and R9 together.

The signal at the base 29 is propagated to the terminal T5 between the condenser C3 and resistor R7 and an additional 90° phase shift is imposed thereon.

The signal at the terminal T5 is applied to the base 35 of a transistor Q3 that operates as an inverter whereby, for the critical frequency, a total shift of 360° is attained. The transistor Q3 has a collector 36 connected through fixed resistors R10 and R11 to the B2 supply terminal and the emitter is connected to the B⁰ terminal by a fixed resistor R12, a potentiometer resistor R13 and a fixed resistor R14. The resistors R12, R13 and R14 determine the suitable D.C. bias for the transistor Q3. The signal at the base 35 is propagated to a collector terminal T6 but the signal suffers a 180° phase shift. A positive feedback loop is established through a D.C. blocking condenser C4 and a feedback resistor R15 to the base 28.

Due to the selective action of the phase shift network C1–R1 and C3–R7, the 360° phase shift relationship will exist for one and only one frequency and oscillations will be produced providing the loop gain is greater than one.

In order to ensure adequate loop gain, a bypass condenser C5 shunts the resistor R14 in the emitter circuit of the transistor Q3.

By adjusting the values of the resistors R1 and R7, the frequency of oscillations is changed. Thus a different characteristic frequency is then required to produce a voltage drop across the condensers C1 and C3 respectively equal to that across the resistors R1 and R7. The sliders 21 and 34 are coupled, as indicated by the dashed lines, so as to produce simultaneous adjustment in both circuits. The potentiometer resistor 22 provides a fine adjustment and alters the resistance R1. It has been found that a corresponding potentiometer is unnecessary in the phase shift network C3–R7. A phase shift of say 89° in the first phase shift network coupled with a phase shift of 91° in the second network nevertheless produces the combined 180° shift required for application to the inverter transistor Q3. A suitable frequency meter (not shown) may be used to determine the desired setting of the sliders 21–34 and 23.

The gain in each of the phase shift networks cooperable with transistors Q1 and Q2 is less than one. However, the circuit for the inverter transistor Q3 makes up for this deficiency so that the combined gain is greater than one. Attenuation of feedback is determined primarily by resistor R15 in the feedback loop. However, for fine adjustment of gain, a slider 37 cooperable with the potentiometer resistance R13 is shifted, thus controlling the degenerative effect of the signal in the circuit of the transistor Q3.

In a manner hereinafter to be described, an A.C. voltage regulating signal is injected into the circuit of the transistor Q3 in order to adjust the oscillator output to the value required at the amplifier output terminals T1 and T2. This signal is derived from terminals marked "FROM VOLTAGE CONTROL" and is applied across the resistor R11 in the collector circuit. The signal so applied varies the total positive feedback in the oscillator thus accomplishing the desired adjustment. The feedback voltage necessary for oscillation is provided by the A.C. voltage drop developed across resistors R10 and R11 and is attenuated by resistor R15 in the feedback loop. If the lead from voltage control to point T7 were disconnected, the oscillator feedback voltage would be entirely due to the A.C. component of current through transistor Q3. When the lead from voltage control to point T7 is in place as shown, and the voltage between T1 and T2 is higher than normal, the voltage control (to be hereinafter described) feeds a current through resistor R11 which is opposed in phase to the voltage produced by the A.C. current through transistor Q3, and which therefore reduces the feedback voltage developed across resistors R10 and R11. This in turn reduces the oscillator voltage driving amplifier 13, and therefore the output voltage, until a state of equilibrium is reached. Conversely, when the output voltage is low, the output of the voltage control may invert its phase, if necessary, to maintain constant voltage between T1 and T2. In this case, the voltage control would thus add to the oscillator positive feedback voltage and thereby increase oscillator output. The fixed resistor R12 ensures that the output signal at T6 is at all times greater than that necessary to sustain oscillations. The resistors R12 and R13 may be formed as parts of a common potentiometer resistor by imposing a stop limiting movement of the slider 37. The resistors 19–20 and 32–33 may similarly be formed.

The output from the oscillator is derived through an emitter follower circuit so as to achieve a suitable buffering action and thus prevent the amplifier from affecting the oscillator. Thus the signal at the terminal T6 is applied to the base 38 of an emitter follower transistor Q4. The collector 39 of the transistor Q4 is directly connected to the B2 terminal and the emitter 40 is connected through an emitter follower resistor R16 to the common terminal B⁰. Output is derived from the emitter 40 to the input of the first amplifier 11.

The regulator 15 includes a Zener diode Z having its cathode connected to the common terminal B⁰. Its anode is connected via resistor R17 to the output terminal B1 of the supply 14. The emitter 41 of a transistor Q5 provides the B2 terminal for the oscillator 12. The collector 42 of the transistor Q5 is connected to the negative output terminal of the supply 14. The base 43 of the transistor is connected to the anode of the Zener diode. The Zener diode has a characteristic voltage substantially below the nominal output voltage of the supply. For example, the supply 14 may provide 28 volts and the Zener diode Z may have a characteristic voltage of 20 volts. Due to the action of the Zener diode on the base 43 of the transistor Q5, the emitter 41 cannot have a voltage greater than minus 20 volts. Thus, should the emitter 41 and the B2 terminal tend to assume a voltage greater than minus 20 volts, there will be no base current through the transistor Q5 and hence the transistor Q5 will cut off. Should the emitter terminal 41 fall below minus 20 volts, increasing base current flows, and the potential will be raised. Accordingly, the emitter terminal 41 is maintained substantially at minus 20 volts.

A charging condenser C6 parallels the Zener diode Z such that when the power supply is turned on, the voltage at the emitter 41 and the terminal B2 rises slowly for purposes hereinafter to be described.

In FIG. 4 the amplifier stages are illustrated. A mixing transistor Q6 drives the primary winding 44 of a coupling transformer 45. The emitter 46 of the transistor Q6 is connected to one side of the winding 44 and the other side of the winding 44 is connected through a biasing resistor R18 to the common terminal B⁰. A bypass condenser C7 parallels the biasing resistor R18. The collector 47 of the transistor Q6 connects via a resistor R19 to the supply terminal B2 derived from the regulator 15.

A feeder resistor R20 transmits the signal from the oscillator to the base 48. A feeder resistor R21 transmits to the base 48 a feedback stabilizing signal derived from the output. (See also FIG. 1.) The alternating current signal amplified by the mixing transistor Q6 has a circuit path that includes a condenser C7, the transformer winding 44, the emitter and collector 46 and 47, the load resistor R19 and a condenser C8 which shunts the regulator 15, and the supply 14.

The transformer 45 has a secondary winding 49 that operates transistors Q7 and Q8 in push-pull arrangement, and the transistors Q7 and Q8 in turn drive a second coupling transformer 50. The secondary winding 51 of the coupling transformer 50 operates transistors Q9 and Q10 in push-pull arrangement, and the transistors Q9 and Q10 through a coupling transformer 52 operate output transistors Q11 and Q12 in push-pull. The transistors Q11 and Q12 operate an output transformer 53, the secondary winding 54 of which provides the terminals T1 and T2.

In order to disable the amplifier circuit upon the existence of overload, the secondary winding 51 may be short-circuited so as to deprive the push-pull transistors Q9 and Q10 of signal. Resistors 55 and 56 serially associated with the emitters 57 and 58 of the transistors Q7 and Q8 which provide emitter feedback to minimize distortion also protect the transistors Q7 and Q8 in the event that the secondary winding 51 is shorted.

The secondary winding 51 has a center tap or terminal T8 that connects via lead 59 to a center terminal T9 of the primary winding 60 of the succeeding coupling transformer 52. The lead 59 connects to the common terminal B⁰ of the unregulated supply 14 to define the neutral with respect to which the push-pull transistors Q9 and Q10 operate. The collectors 61 and 62 of the transistors Q9 and Q10 are connected together and to the B1 terminal of the supply 14. Emitters 63 and 64 are respectively connected to the outside terminals of the output winding 60. The bases 65 and 66 of the transistors Q9 and Q10 are respectively connected to the outside terminals of the input winding 51.

In order to short-circuit the secondary winding 51 upon the existence of overload, a transistor Q13 is provided. The transistor Q13 of course is a direct current device, and in order to make it possible to use a single transistor Q13 to short out the transformer winding 51, diodes D1 and D2 are utilized for coupling the transistor Q13 to the circuit. The diodes D1 and D2 are connected in series and in back-to-back arrangement across the secondary winding 51. Normally there is no current flow through these diodes. But the center terminal T10 between the diodes connects to the common lead 59 through the transistor Q13. The transistor has its emitter 67 connected to the common lead 59 and its collector 68 connected to the center terminal T10. When the transistor Q13 is switched on, the halves of the winding 51 are respectively shorted through the diodes D1 and D2 upon alternate swings of the signal applied to the coupling transformer 50 and through obvious paths. The polarity of the diodes D1 and D2 is so chosen as to produce the requisite shunting during those half cycles in which the amplifying transistors Q9 and Q10 would otherwise be operative.

Figure 5:
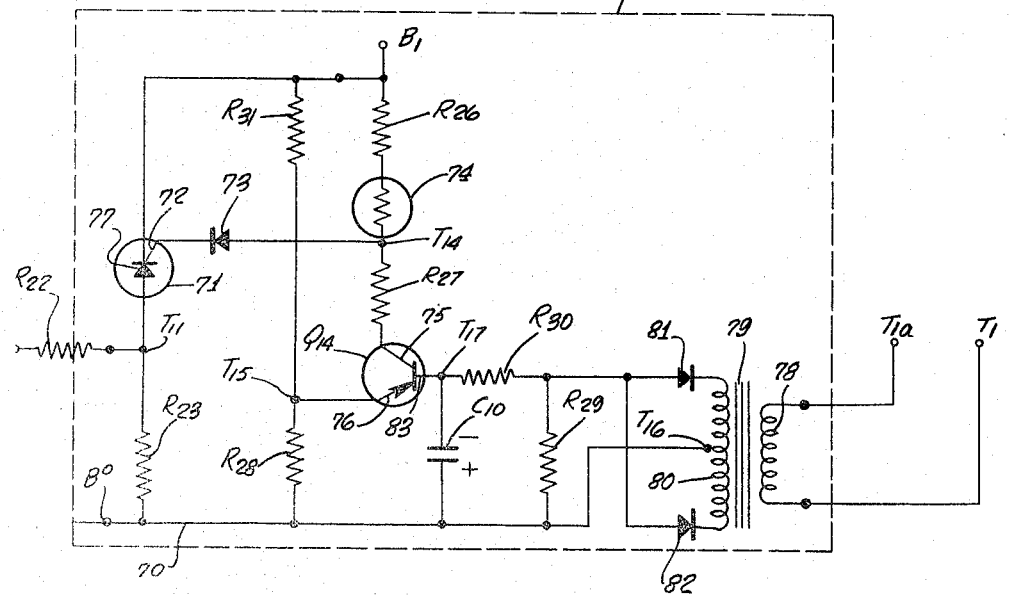
FIG. 5 is a wiring diagram illustrating the overload protection circuit.

The base 69 of the switching transistor Q13 is normally at the potential of the common lead or supply terminal B⁰ but it may be switched to a relatively large negative voltage, thus saturating the transistor Q13. For this purpose, the circuit illustrated in FIG. 5 is provided.

A control terminal T11 (FIG. 5) connects through a resistor R22 to the terminal T12 (FIG. 4) at the base 69 of the switching transistor Q13. The terminal T11 (FIG. 5) connects to the common lead 70 through a resistor R23. The control terminal T11 also connects through a silicon controlled rectifier (SCR) 71 to the B1 terminal. The SCR has a power circuit from terminal B⁰, resistor 23, anode and cathode of SCR 71, and a lead to terminal B1. Normally the silicon controlled rectifier 71 is off. The control terminal T11 and the base terminal T12 are then at the potential of the common terminal B⁰. Thus the control terminal T11 connects to the common lead 70 through two paths, one via resistor R23 to lead 70 and the other via resistor R22 and a resistor R24 (FIG. 4) to emitter terminal T13 and common lead 59. However, when the SCR 71 is switched on, the control terminal T11 is connected through the SCR 71 (FIG. 5) to the B1 terminal, and accordingly, current flows through the divider network consisting of the resistors R22 and R24. The base terminal T12 (FIG. 4) is then at a sufficient negative potential relative to the emitter terminal T13 so as to saturate the switching transistor Q13. Thus the amplifier is disabled.

In order to switch on the SCR 71 (FIG. 5) a circuit is provided for the gate 72 thereof. The gate 72 connects via a protective blocking diode 73 to a terminal T14 of a voltage divider network. The voltage divider network consists of a resistor R26 connected to the B1 terminal, a thermistor 74 to the terminal T14, a resistor R27 to the collector 75 and emitter 76 of a control transistor Q14, a terminal T15 and a resistor R28 to the common lead 70. The transistor Q14 is normally sufficiently non-conductive such that the terminal T14 is only slightly positive relative to the cathode 77 of the SCR whereby the gate current is inadequate to switch the SCR 71 on. However, should the transistor Q14 become increasingly conductive, the terminal T14 becomes more positive (or in fact less negative) and adequate triggering current is passed through the gate 72.

The transistor Q14 reaches its critical conductivity state when the output current rises to a predetermined value. For sensing output current, the primary winding 78 of a current transformer 79 (see also FIG. 1) is serially inserted ahead of one of the output terminals. The current in the secodary winding 80 is full-wave rectified by the aid of a center tap T16 connected to the common lead 70, and two rectifying diodes 81 and 82. This rectified current passes through a load resistor R29, the ohmic value of which is quite small relative to any possible value of the inductive reactance of transformer 79. Accordingly, the voltage across resistor R29 is independent of frequency.

A resistor R30 and a small condenser C10 provide a slight filtering action. But this circuit has a small time constant. A terminal T17 between the resistor R30 and the condenser C10 is connected to the base 83 of the control transistor Q14. The emitter 76 of the control transistor Q14 is held at a substantially constant potential by the aid of a voltage divider network. The voltage divider network comprises a resistor R31 and the resistor R28 serially connected together and across the source.

The voltage of the base 83 is dependent upon the magnitude of load current. As load current increases, the control transistor Q14 becomes increasingly conductive so as to raise the gate current to the SCR 71. The circuit is so designed that the SCR 71 switches on should the load current rise by a predetermined factor.

As the ambient temperature increases, the current required to fire the SCR is diminished. The thermistor 74 compensates for this characteristic. Thus with increase in temperature, the resistive value of the thermistor 74 decreases.

Once an overload condition exists, the secondary winding 51 continues to be shorted to prevent passage of signal to the output stage. This occurs because the SCR 71 remains on until current thereto is interrupted whatever may subsequently happen to the transistor Q14. The SCR, together with elements associated therewith, accordingly forms a holding circuit for keeping the transistor Q13 switched on. In order to reset the holding circuit including the SCR 71, the entire supply is shut down as by operation of a suitable switch (not shown) incorporated in the unregulated supply 14. Optionally, a reset button could be incorporated in the circuit of the SCR 71.

Figure 6:
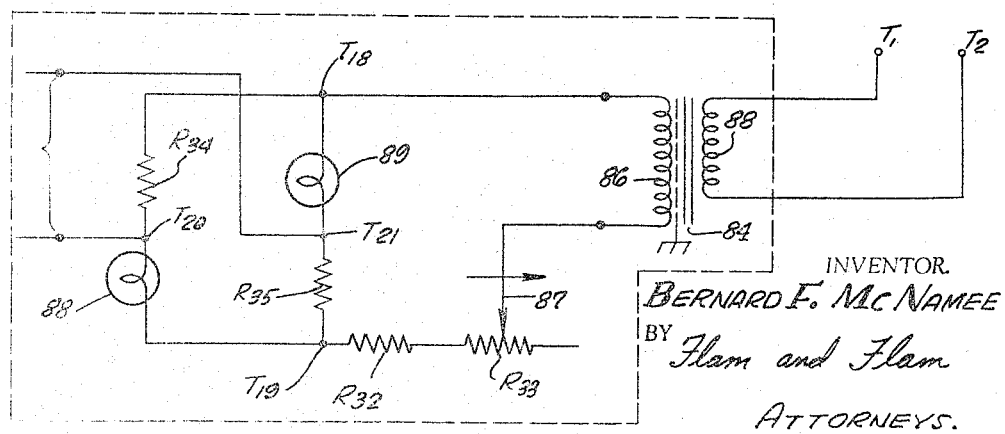
FIG. 6 is a wiring diagram of the voltage control circuit.

In FIG. 6 there is illustrated the circuit for regulating the output voltage. The regulator circuit is operated by a transformer 84, the primary winding 85 of which is connected across the output terminals T1 and T2. The voltage generated by the secondary winding 86 of the transformer 84 is impressed upon the lamp bridge circuit. One input terminal T18 of the bridge is connected to one side of the transformer secondary winding 86. The other input terminal T19 of the bridge connects via a fixed resistor R32, a potentiometer resistor R33 and a slider 87 to the other side of the transformer secondary winding 86.

One leg of the bridge includes a resistor R34 and a tungsten lamp 88 serially connected together and across the input terminals T18 and T19. The other leg of the bridge consists of a tungsten lamp 89 and a resistor R35 serially connected together and across the input terminals T18 and T19.

One side of the lamp 89 is connected to one input terminal T18, whereas one side of the lamp 88 is connected to the opposite input terminal T19. Intermediate terminals T20 and T21 are formed by the bridge circuit.

The resistors R34 and R35 have the same value, and the lamps 88 and 89 in accordance with known characteristics have a variable resistance depending upon the magnitude of current flowing through them, but their value is generally of the order of that of the resistors R34 and R35.

If the bridge is balanced, no signal is developed; but if the current in the bridge changes in accordance with output voltage, a signal will be created since upon a change in bridge current, the voltages at terminals T20 and T21 shift in opposite directions.

The signal developed between the mid-terminals T20 and T21 is applied across the resistor R11 (FIG. 2) in such polarity as to decrease the oscillator positive feedback voltage developed in resistors R10 and R11.

When the lamps 88 and 89 are cold and the system is switched on, the bridge signal is quite high ostensibly corresponding to a small output voltage. This would tend to increase the gain of the oscillator, and the output voltage would rise excessively.

In order to allow a certain warm-up time for the lamps 88 and 89, and thus prevent any false correction, the condenser C6 (FIG. 2) delays the build up of supply voltage to the oscillator so that, even with a large bridge signal, the output voltage at T1–T2 is kept tolerable. As the lamps warm up, the bridge signal decreases while oscillator power voltage increases.

The adjustment of the slider 87 determines the normal current through the lamps 88 and 89 and hence the voltage output. The resistor R32 limits the setting.

The phase shift components of the oscillator can be rearranged in any order in order to provide the requisite 360° total phase shift. Furthermore, the number of phase shift sections can be changed from two to a larger number. In such circumstances, a multiple phase power supply can be provided by driving a series of separate amplifier sections from different points in the oscillator circuits.

The inventor claims:

1. In an A.C. power supply: an oscillator; an amplifier having a class A amplifier stage coupled to and driven by said oscillator and a power stage; a coupling between said stages; a switching means operable to shunt the coupling for preventing the application of the oscillator signal to said power stage; means including resettable means sensitive to absolute value of load current for operating said switching means; and said resettable means holding the switching means operable to shunt said coupling.

2. In an A.C. power supply: an oscillator, an amplifier deriving a signal from said oscillator and having a class A amplifier stage and a push-pull power stage; a coupling transformer between said stages and having a secondary winding provided with a center tap; a pair of diodes connected in series and across said winding with the diodes in back-to-back relationship; there being an intermediate terminal between said diodes; a transistor connecting said intermediate terminal to said center tap; means normally biasing said transistor to cut-off; means sensing amplitude of load current for switching said transistor on; and means capable of being reset for holding said transistor on.

3. In an A.C. power supply: an oscillator; an amplifier deriving a signal from said oscillator and having a class A amplifier stage and a push-pull power stage; a coupling transformer between said stages and having a secondary winding provided with a center tap; a pair of diodes connected in series and across said winding with the diodes in back-to-back relationship; there being an intermediate terminal between said diodes; a transistor connecting said intermediate terminal to said center tap; means normally biasing said transistor to cut-off; a controlled rectifier; a power circuit for said controlled rectifier; circuit means operated when the controlled rectifier is on for switching the transistor to shunt said secondary winding; a control circuit for said controlled rectifier; and means sensing amplitude of load current for operating said control circuit when the load current reaches a predetermined value.

4. In an A.C. power supply: an oscillator having an amplifier; a resistor forming a load for said amplifier; a feedback loop deriving from said resistor a voltage for positive feedback to sustain oscillations; a power amplifier beyond said loop and deriving a signal from said oscillator, and providing A.C. power at a usable energy level; means for producing an alternating current signal corresponding in polarity and amplitude to the deviation of the amplifier output voltage from a set point; means operated by said alternating current signal to increase the positive feedback when the amplifier output voltage falls below said set point and to decrease said positive feedback when said amplifier output voltage rises above said set point, including means to impress said signal across at least a portion of said resistor.

5. In an A.C. power supply: an oscillator having an amplifier, a resistor forming a load for said amplifier, a feedback loop deriving from said resistor a voltage for positive feedback to sustain oscillations; a power amplifier beyond said feedback loop; deriving a signal from said oscillator and providing A.C. power at a usable energy level; a bridge having a pair of excitation terminals, a pair of bridge branches, each including a pair of resistors, one of the resistors of each branch having a value that varies in accordance with the magnitude of current through the branch; there being midterminals between the pairs of resistors of each branch; means operatively connecting said excitation terminals across the output of the power amplifier whereby the current through said bridge branches corresponds to the amplitude of the power amplifier voltage; the variable resistors of the branches being oppositely arranged in the respective branches whereby the A.C. voltage across said mid-terminals corresponds in polarity and magnitude to the deviation of the power amplifier output voltage from a set point; and circuit means applying the midterminal voltage cross at least a portion of said load resistor in such polarity as to increase the positive feedback when the power amplifier output voltage falls below said set point and to decrease said positive feedback when said power amplifier output voltage rises above said set point.

6. The combination as set forth in claim 5 in which said oscillator includes solid state amplifier elements, and together with a D.C. power supply for energizing said oscillator; and a condenser operatively interposed between said power supply and said oscillator for limiting the rate of build-up of the D.C. voltage to said oscillator whereby the variable resistors of said bridge branches are allowed to stabilize before full D.C. voltage is applied to said oscillator.

7. In an A.C. power supply: an oscillator; an amplifier deriving a signal from said oscillator, and providing A.C. power at a usable energy level; said amplifier having a push-pull output stage the operative elements of which are transistors, said amplifier having an intermediate coupling in advance of said output stage; controllable solid state switching means connected to said coupling, said switching means having an on state in which said coupling deprives the succeeding stages of signal, and having an off state in which signal is transmitted through said coupling to the succeeding stages; and solid state means including resettable means responsive to load current rising above a critical absolute value for switching said switching means to its on state; said resettable means holding said switching means in its on state until the power supply is shut down.

8. In an A.C. power supply: an oscillator; an amplifier deriving a signal from said oscillator, and providing A.C. power at a usable energy level; said amplifier having a push-pull output stage the operative elements of which are transistors, said amplifier having an intermediate coupling in advance of said output stage; controllable solid state switching means connected to said coupling, said switching means having an on state in which said coupling is shorted to deprive the succeeding stages of signal, and having an off state in which signal is transmitted through said coupling to the succeeding stages; a controllable solid state trigger device having an on state and an off state, and remaining in an on state until current through said device is reduced below a critical value; circuit means dependent upon said trigger device being in its on state for switching said switching means to its on state; a voltage divider circuit for said trigger device including a solid state controllable variable impedance element; a connection between said divider circuit and said trigger device for switching said trigger device from its off state to its on state when the variable impedance reaches a critical value; a substantially unregulated D.C. power supply controlling said variable impedance element, including a current transformer for operating said power supply, and serially connected with the output of said amplifier whereby the D.C. voltage is a measure of load current.

References Cited by the Examiner

UNITED STATES PATENTS

| | | | |
|---|---|---|---|
| 2,302,895 | 11/1942 | Root | 331—183 X |
| 2,451,021 | 10/1948 | Detuno | 331—137 X |
| 2,638,569 | 5/1953 | Holt | 328—175 X |
| 2,749,441 | 6/1956 | Kelly | 331—137 |
| 2,784,263 | 3/1957 | Curry et al. | 330—145 X |
| 3,157,841 | 11/1964 | Gilbert | 331—183 X |
| 3,211,927 | 10/1965 | Klee | 328—8 X |

OTHER REFERENCES

Fraser, "A Wide-Range RC Phase-Shifter Oscillator," Electronic Engineering, May 1956, pages 200–202.

Queen, "4 Instruments in 1 Package," Radio-Electronics, May 1952, pages 53, 54.

ROY LAKE, *Primary Examiner.*

J. B. MULLINS, *Assistant Examiner.*